March 26, 1957  E. J. G. PHILLIPS  2,786,523
OVERHEAD SLIDING DOOR FOR VEHICLES
Filed Nov. 18, 1950  4 Sheets-Sheet 3
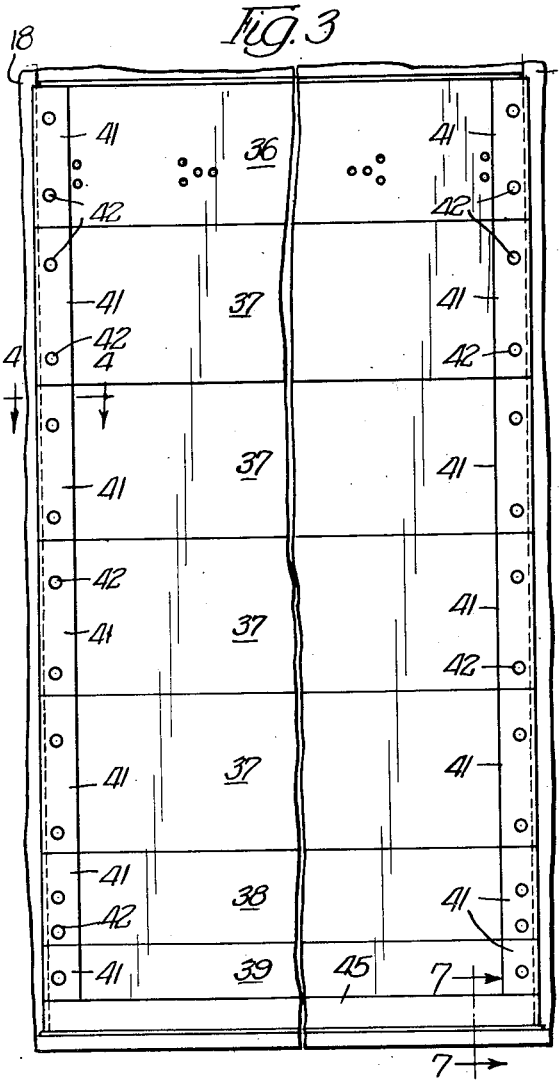
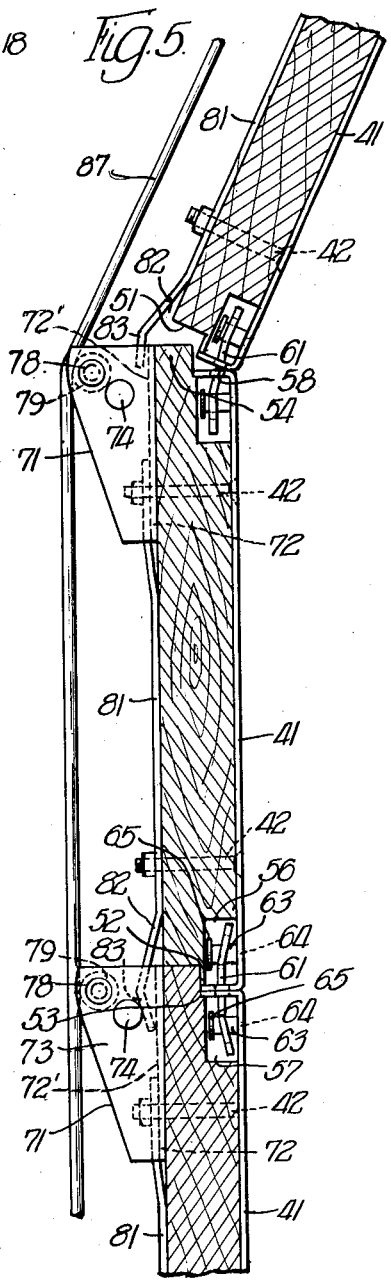
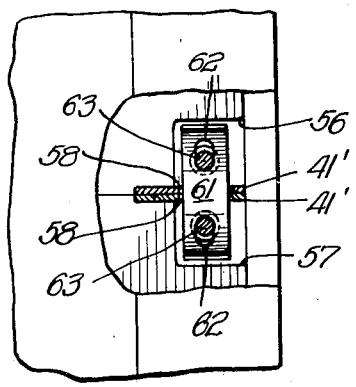
INVENTOR.
Ellis J. G. Phillips,
BY Brown, Jackson,
Boettcher & Dienner March 26, 1957 E. J. G. PHILLIPS 2,786,523
OVERHEAD SLIDING DOOR FOR VEHICLES
Filed Nov. 18, 1950 4 Sheets-Sheet 4
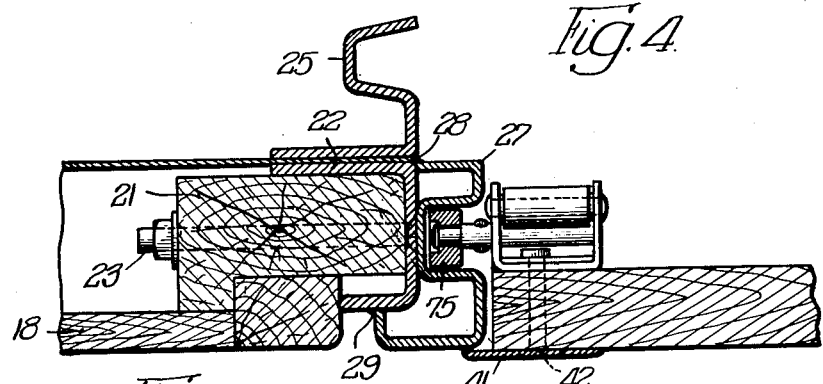
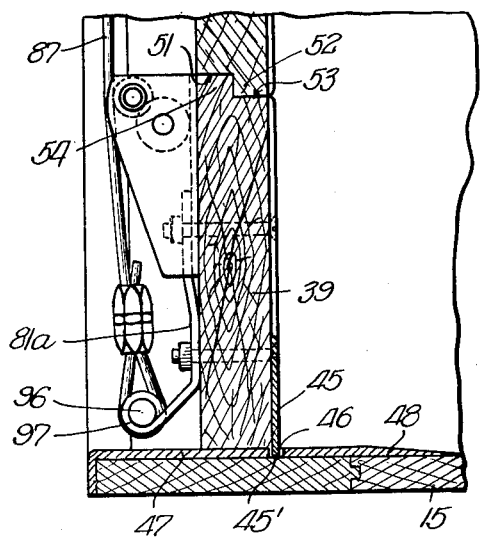
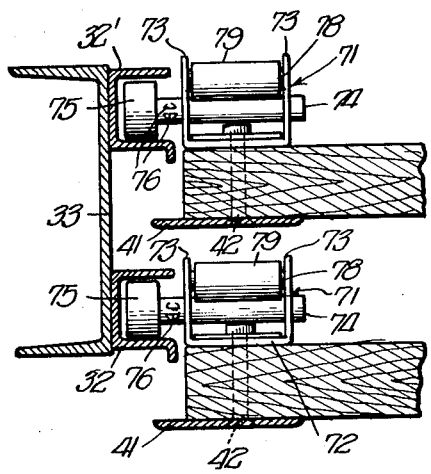
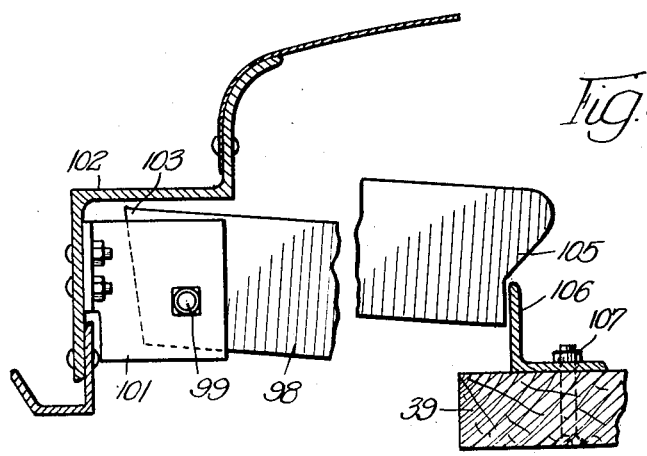
INVENTOR.
Ellis J. G. Phillips,
BY Brown, Jackson,
Boettcher & Dienner

United States Patent Office 2,786,523
Patented Mar. 26, 1957

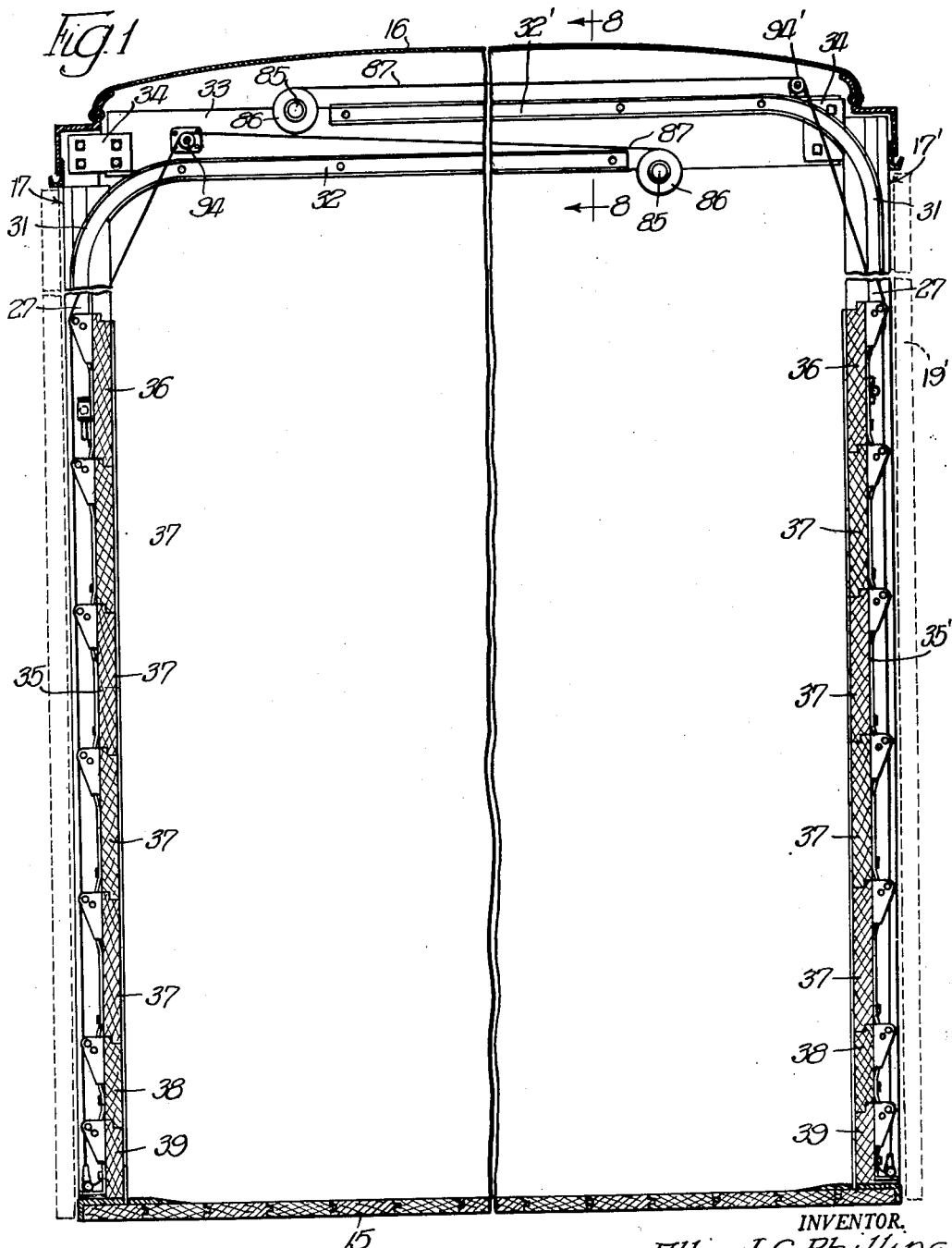

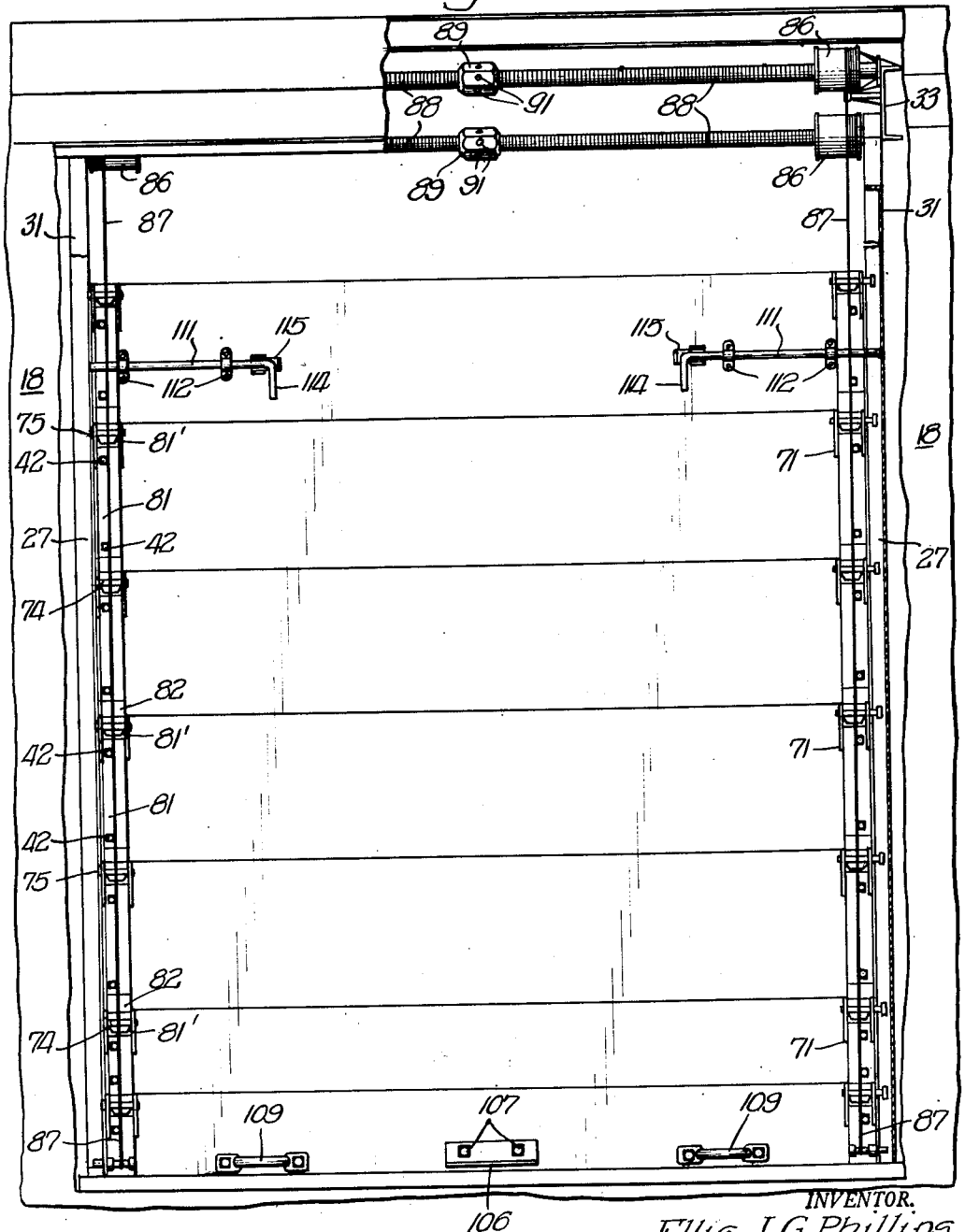

2,786,523

OVERHEAD SLIDING DOOR FOR VEHICLES

Ellis J. G. Phillips, Aurora, Ill., assignor to Richards-Wilcox Manufacturing Co., Aurora, Ill., a corporation of Illinois Application November 18, 1950, Serial No. 196,390

13 Claims. (Cl. 160—191)

The present invention relates to an improved construction of overhead sliding door for vehicles. The door has been devised primarily as a general utility door for the side doorways of railway freight cars, but, as will hereinafter appear, the door can also be used in other vehicles. The main purpose of my improved utility door as applied to a railway box car is to close the side doorways of the box car tightly so that the car can be loaded with bulk materials such as grain, salt, lime, etc., the door, in its closed position, maintaining a very tight doorway, so that these materials will not leak out of the car through the doorway. My improved door is of the overhead sliding type wherein a plurality of connected panels or sections are arranged for sliding movement in guide tracks between a vertical closed position closing the major portion of the door to an overhead open position extending back into the car above the top of the doorway. In the vertical closed position the connected panels or sections fill the major portion of the door opening, but leave an open space above the top panel through which the grain or other bulk material can be fed into the car through a chute, blower duct or the like, and through which the grain or other lading can be inspected, sampled, etc.

My improved door is of general utility in the sense that it can also be used for closing the doorway when the freight car is transporting other cargo than bulk materials. For example, on one run or trip the freight car may be used for transporting bulk grain, and on the return trip or on another run the car may be used for transporting other types of cargo, possibly of a fragile nature, such as bags of flour, cartons of food, furniture, etc., my improved overhead sliding door being employed for closing the major portion of the doorway in both instances. The conventional outer door having horizontal sliding movement along the outside wall of the car is preferably retained to provide a closure for the entire height of the doorway for protecting the lading against exposure, and which can also be locked against theft, pilfering, etc. In devising an overhead sliding door for railway freight cars and other vehicles adapted to carry cargo which may be of a fragile nature, such as bags of flour, cartons of food, furniture, etc., certain conditions and requirements arise which are not present in the case of overhead sliding doors for garages, buildings and the like. For example, in the case of an overhead sliding door for a railway freight car, it is practically essential that the major portion, if not all of the door hardware, be disposed on the outer side of the door so that fragile cargo which may be shoved against the door in the loading of the car, or which may jostle or vibrate against the door in the travel of the car, will not be injured by striking or rubbing against projecting portions of door hardware. The advantages of a practicable overhead sliding door for holding bulk cargo such as grain in a railway freight car will be best understood by first referring to the difficulties and objections to the present day practice of providing temporary closures in the doorways of box cars preparatory to loading the bulk cargo in the car. The present procedure is to nail approximately four wood panels, each about seven feet long and twenty inches high, across each doorway, with the possible addition of two more inside lower panels for reinforcement. The car is then loaded with the grain or other bulk cargo through the space between the top of these panels and the top of the doorway. When the car is to be unloaded, the panels are pried upwardly or inwardly by the use of crowbars, jacks or possibly some special lifting devices made particularly for this purpose. When the panels have been forced upwardly or inwardly a short distance, the bulk cargo flows out of the car between the floor and the bottom of the loosened panels. After a sufficient amount of this bulk cargo has been discharged from the car to relieve the upper panels from the pressure of the lading, the panels are knocked loose from the doorway to permit completion of the unloading operation. In prying the panels inwardly or upwardly, the nails by which the panels are held to the doorway are bent and partially or completely pulled out of the door jambs. In so doing, some of the panels are almost certain to be damaged to the extent of requiring repairs before they can be used again, and some of the panels will be damaged beyond repair. In many instances a car which has been used for conveying bulk materials to one destination will be loaded with an entirely different type of material on its return trip, which latter material may not require a tight closure of the doorway. In such cases, the wood panels are generally taken out of the car and stored in piles for future use, where they may remain for a considerable period of time unused, being exposed to the weather and consequent deterioration. On the other hand, the panels may be stolen for use as fire wood, the building of fences, small buildings, etc. Still further, many cars using wood panels to hold bulk cargo are destined to points beyond the rails of the railroad originating such shipments, and this results in considerable loss to the originating railroad. This is because these wood panels, which are the property of the originating railroad, are confiscated by the destination railroad, and must be replaced with new panels or be brought back from the destination railroad, all requiring handling, storage space, sales records, etc.

All of the foregoing represents a tremendous loss to the railroads, due either to the loss of the panels entirely, or to the necessity for extensive repairs on the panels before they can be used again, or the time lost by railroad employees searching for panels, or the accumulation and resale of panels, etc.

The general object of the present invention is to overcome the objections and losses characterizing the present practice of making a grain door or the like, by providing an improved overhead sliding door which will remain in the car at all times, so that it can be instantly brought into use whenever desired; which can be very easily operated into closed position and into open position; and which is built in such a manner that it cannot be readily removed from the car by anyone trying to steal the door or any part of the door. Each door is made up of a plurality of horizontally extending door panels which may be made up of heavy wood in one piece, or which may be built up of two or more thicknesses, nailed, screwed, or otherwise fastened together. The door is arranged for overhead sliding movement by providing guide rollers adjacent the top edge of each door panel which operate in channel shaped guide tracks secured to the vertical door jambs. The upper ends of the vertical sections of the guide tracks curve in an inward direction adjacent the upper end of the doorway and continue inwardly in horizontal track sections disposed just below the roof of the car. In this regard, one of the features of the invention resides in staggering or overlapping the horizontal track sections leading from one doorway with respect to the horizontal track sections leading from the other doorway. Thus, even though the width of the car is relatively narrow for storing the length of each door, both doors are stored within this relatively narrow width by virtue of the staggered or superposed relation of one set of horizontal track sections with respect to the other set of horizontal track sections.

One of the distinctive features or advantages of my new construction of utility door is the provision of a unique design of lost motion hinge, or loose articulated joint, serving to connect each panel to the next adjacent panel, and spaced from the inner surface of the door so that it cannot possibly have any injurious contact with the cargo. The problem of these hinges between panels is complicated by the fact that the meeting edges of adjacent panels are preferably scarfed to form an overlapping or ship-lap joint between panels so that relatively fine bulk materials, such as salt, lime, etc. cannot leak out between the panels; also so that the closure which is established by the panels is externally weathertight against rain, snow, dust, etc. The presence of this ship-lap joint at the meeting edges of adjacent panels requires that as the panels move down around the curved sections of the guide track in the door closing operation there must be quite accurate alignment or matching of these meeting edges in order that the upper and lower halves of each ship-lap joint will mate or nest properly. At the same time, the articulated connection between adjacent panels must permit enough lost motion or relative movement between panels to accommodate the movement of the panels and their ship-lap joints around short radius curved tracks, which curved tracks must necessarily be of relatively short radius because of the limited space available in a railroad freight car. One of the features or advantages of the present invention resides in the provision of these improved lost motion hinges or loose articulated joints mounted in the door panels in spaced relation from the inner surfaces of the panels, and permitting the necessary relative freedom of movement between adjacent panels, both in the vertical plane and in the transverse or horizontal plane, to accommodate the hinging movement of the panels and their ship-lap joints around the relatively short radius of the curved track sections.

Another feature or advantage of the invention resides in the provision of improved aligning plates or guide plates mounted on the outer sides of the door panels and performing an aligning or guiding function between adjacent panels whereby to insure that the two mating portions of each ship-lap joint will be in proper mating relation as the panels move downwardly from the curved sections of the track into the vertical sections, when the door is to assume its closed position. Because of the short radius of curvature of the curved track sections required in these railroad car installations, it is not practicable or not advantageous to provide guide rollers effective for guiding both the top edge and the bottom edge of each panel. Accordingly, I only provide guide rollers effective for guiding the upper edge of each panel, so that there are no guide rollers on the lower part of each panel to hold it in place. Instead, reliance is placed upon the above mentioned aligning plates or guiding plates for guiding the lower edge of each panel into proper relation to the upper edge of the next adjacent panel as the panels start moving down from the curved sections of the track into the vertical lower sections of the track.

Those features of the invention having to do with making the door weatherproof against the entrance of rain, snow, dust, etc. are also of decided importance for increasing the general utility of the door in connection with the loading and transportation of other cargoes than bulk cargo, which other cargoes might also be injured by the weather. For example, in the loading and transportation of such cargoes as bags of flour, paper cartons of food, etc., these cargoes are frequently not loaded any higher than the top of my improved utility door. Hence, this utility door affords a rain-proof, snow-proof, dust-proof and wind-proof closure extending up to a height equal to the top of such load. The conventional outer door is also closed to aid in closing off the upper portion of the cargo, but experience has proven that the ordinary outer door alone does not give adequate weather protection for such cargoes as bags of flour, etc. My improved utility door also facilitates the loading of many types of cargo, particularly cargo which can be inserted into the car through the open space above the top of the utility door when the latter is in its closed position. According to one typical practice with my improved utility doors, the ends of the car are first loaded to the desired capacity, and thereupon the loading of the middle section is started by closing one utility door at one side of the car and piling cargo against this door. When the loading of the middle section has almost reached the other doorway, the utility door at this side is closed, and the loading can then be continued and completed, particularly at this side of the middle section, by inserting cargo into the car over the top of this latter utility door, or over the tops of both utility doors.

Another feature or advantage of the invention resides in an improved spring counterbalancing mechanism for each door. Each door has its individual counterbalancing mechanism comprising cable winding drums mounted on a spring supporting shaft which is suspended below the roof of the car adjacent the horizontal track section. Cables pass from these two drums down over the outer sides of the door panels, adjacent each side edge of the door, and have attachment to the lowermost panel of the door. The attachment of each cable to this lowermost panel is in such manner that the tension transmitted to the cable tends to hold this lowermost panel pressed outwardly for holding this lower panel in a weathertight and leaktight joint against the door jambs. Another feature in this regard is the provision of a cable guiding roller on the outer side of each door panel for guiding the cable in the raising and lowering movement of the door so that the cable will not cut into the top edges of the panels when the panels are moving in or near the curved sections of the track. Still another feature of this improved spring counterbalancing mechanism is the provision of an automatically shifting winding reel for each cable whereby each reel will have back and forth axial sliding movement so that the cable will wind upon and unwind from its reel in a level winding operation, without irregular piling up of later turns of the cable upon earlier turns. This automatic shifting of each cable reel is effected by the action of the associated torsion spring increasing in length or decreasing in length as a greater or lesser number of convolutions or turns are built up in the springs or subtracted therefrom in the winding and unwinding operation of the reels. Provision is made for easily adjusting the counterbalancing torsion of these springs to meet the requirements of individual installations.

Another feature or advantage of the invention resides in the provision of an improved hold-open latch for holding each door in its overhead open position, so that it cannot be jostled or shaken down into its closed position by vibration or jolting of the car in the travel thereof.

Other features, objects and advantages of the present invention will be apparent from the following detailed description of one preferred embodiment thereof. In the accompanying drawings illustrating such embodiment:

Figure 1 is a fragmentary vertical sectional view taken transversely through a typical railway freight car showing my improved utility doors mounted in each of the side doorways of the car, this figure illustrating these doors in their closed positions;

Figure 2 is a fragmentary outer elevational view of one of these doors in its closed position;

Figure 3 is a fragmentary inner elevational view showing the relatively smooth inside surface of the door in its closed position, without any door hardware projecting inwardly therefrom in a position where it might injure the cargo;

Figure 4 is a fragmentary sectional view on a larger scale taken horizontally through one of the door jambs and the adjacent edge of one of the door panels, corresponding to a section taken approximately on the plane of the line 4—4 of Figure 3;

Figure 5 is a vertical sectional view, also on a larger scale, showing the lost motion hinge connection between adjacent panels;

Figure 6 is a fragmentary detail view illustrating one of these lost motion hinge connections as viewed at right angles to Figure 5;

Figure 7 is a fragmentary detail sectional view on this larger scale showing the connection of each counterbalancing cable to the lower door panel;

Figure 8 is a fragmentary vertical sectional view taken approximately on the plane of the line 8—8 of Figure 1 for the purpose of illustrating the staggered or superposed relation of the two doors when in their overhead open positions, and Figure 9 is a fragmentary detail view showing the construction and operation of the hold-open door latch.

Figures 1, 2 and 3 illustrate typical structure of a conventional railway box car, such as the floor 15, roof structure 16, side doorways 17, 17', and conventional side walls 18, 18' extending from the sides of the doorways to the ends of the car. The conventional outer doors which have horizontal rolling or sliding motion into closed positions over the outer sides of the doorways 17, 17', are indicated in dotted lines at 19, 19', these being of any desired or conventional construction.

Referring to Figure 4, in the ordinary wood construction of car, the sides of each doorway are formed of wood side rails or posts 21 which may have their jamb edges faced and reinforced by a vertical section of channel bar 22 secured to the wood side rail 21 by bolts 23, or in any other suitable manner. The Z-shaped bar 25, shown projecting from the outer flange of the jamb channel 22, represents the vertical stop rail against which the leading edge of the conventional outer door 19 strikes when this outer door is moved into its closed position. Secured to the jamb channels 22 at both sides of the doorway are the vertical sections 27 of the guide tracks, these vertical sections being preferably welded to the jamb channels 22, as indicated at 28 and 29. It will be noted from Figure 4 that each vertical section 27 of the guide track is formed with a channel or box-shaped guideway which is disposed in a plane lying outwardly beyond the outer face of the panels of the utility door, for receiving the guide rollers which are mounted on the outer sides of these door panels, as will be later described. Referring to Figure 1, the upper ends of the vertical track sections 27, 27 connect with curved track sections 31, 31 which curve back under the roof 16 of the car. Each curved track section 31 extending inwardly from the left hand doorway 17 connects with an overhead horizontal track section 32, and each curved track section 31 which extends inwardly from the right hand doorway 17' connects with a separate overhead track section 32', the latter being superposed above the track section 32, so that when the two utility doors are moved into their open positions they will lie in overlapping or superposed relation. As shown in Figure 8, the overhead track sections 32, 32' are secured to transverse channel beams 33 which are fastened to the side walls of the car by bolting plates 34. The curved sections 31 and overhead sections 32, 32' have substantially the same channel-shaped form of guideways for guiding the rollers mounted on the door panels.

The left hand utility door 35 and the right hand utility door 35' are both of duplicate construction, each comprising an upper panel 36, a succession of intermediate panels 37 of substantially the same width as the upper panel 36, and two lower panels 38 and 39 which are preferably narrower than the upper and intermediate panels. As previously described, these panels may be constructed of relatively thick single pieces of wood, or they may be constructed of two or more plies or laminations of wood. Referring to Figure 3, the inside face of each panel is provided at each end thereof with an astragal plate 41 which is secured to the individual panel by vertically spaced screw bolts 42 having tapering countersunk inner heads which set into tapering holes in the plate 41 (Figure 5), so that these heads do not project beyond the plate. As shown in Figure 4, the outer edges of the astragal plates 41 project outwardly beyond the ends of their respective door panels, so as to overlap the inner surfaces of the vertical track sections 27. These projecting portions of the plates 41 have contact or approximate contact with the inner surfaces of the vertical track sections, so that the plates 41 function as sealing or closing strips for effecting a sufficiently tight closure along the vertical edges of the door to prevent leakage of such fine bulk material as grain, salt, lime, etc. A correspondingly tight closure is established across the bottom inner edge of the door by bolting a transverse sealing plate 45 to the bottom panel 39. This plate has a bottom lip 45' extending down below the bottom edge of the door for reception in a floor notch 46 (Figure 7) which is defined between the inner edge of a sill angle 47 and a tread plate 48. In addition to providing a tight bottom closure, the engagement of lip 45' in the floor notch 46 prevents the door panels from bulging outwardly under the pressure of the load inside the car.

Referring again to Figure 4, it will be seen that the inner surfaces of the door panels 36—39 lie substantially flush with the inner surface of the inside panels of the side walls 18. Thus, when these utility doors are in their closed positions they present a substantially smooth continuous inner wall along the length of the car and prevent the possibility of cargo being injured by jolting or vibrating against the side jambs of the doorways 17, 17'. It will be seen that the only surfaces which project inwardly from the inner sides of the door panels are the closure strips 41, and these are very thin and have their edges rounded so that they do not present any objectionable projections. Moreover, these strips 41 might be recessed into the bodies of their respective door panel, if desired. The ends of these strips or closure plates 41 come substantially into abutment when the door panels are in their closed positions, as shown in Figure 3.

Referring now to the lap joints at the meeting edges of adjacent panels, it will be seen from Figures 1, 5 and 7 that the lower edge of each panel is scarfed or notched out to form an outside notch 51 and an inside tongue 52; and the adjacent upper edge of each panel is reversely notched out to form an inside notch 53 and an outside tongue 54. When the panels are in closed position, the overlap of this joint affords a very tight fitting closure which is effective to prevent leakage of such fine bulk material as grain, salt, lime, etc. Because of the lost motion characteristic of the hinges which connect adjacent panels, these hinges do not interfere with downward motion of each successively higher panel, with the result that the weight of the panels is effective to keep the lap joints pressed together in direct physical contact down through the entire series of panels when the door is in closed position.

Referring now to these lost motion hinges or articulating links, it will be seen from Figures 5 and 6 that matching recesses 56 and 57 are cut out of the inner surfaces of the panels at the ends or side edges thereof, whereby the recess 56 extends upwardly from the end of the tongue portion 52 of each upper panel edge, and the recess 57 extends downwardly from the notch portion 53 of each lower panel edge. These recesses 56 and 57 are formed directly under or in back of the astragal edge plates 41 and the ends of such plates are bent over to form end flanges 41' at the meeting ends of the recesses 56 and 57. These end flanges 41' have matching slots 58, 58 punched therein, through which passes the strap or link 61 which establishes the lost motion hinge connection between the panels. The end portions of this link 61 are formed with elongated slots 62 which have a sliding fit over the shanks of studs 63 fixedly secured to the metallic edge strips 41 and disposed within the recesses 56 and 57. The base end of each stud 63 is riveted in a hole in the edge plate 41, as indicated at 64, and the other end of the stud is provided with an enlarged head or flange 65 which prevents the slotted link 61 from slipping off the end of the stud. The ends of each hinge link 61 are bent to slope slightly in an inward direction so as to prevent binding between the hinge plate and the studs during the hinging movement between the panels (as clearly illustrated in the case of the upper hinge connection in Figure 5). It will be seen that the lost motion or freedom which is provided for by the elongated slots 62 readily permits the adjacent edges of the panels to move toward and away from each other in the hinging operation of passing around the curved sections 31 of the guide tracks. This freedom of the panels to move toward and away from each other during the hinging operation is quite important because of the relatively short radius of curvature of the track sections 31 required in the case of railway freight cars, and also because of the presence of the lap joints 51—54 at the meeting edges of adjacent panels. As relative separation occurs between panels in the hinging operation, the hinging or articulating link 61 also has a greater latitude of lateral movement with respect to the two panels, particularly because of the separating distance between the slots 58 in the end flanges 41'. This freedom for lateral movement (viz. inward or outward movement with respect to the plane of the doorway) gives the necessary freedom at the lap joint 51—54 in the short radius hinging movement that occurs during the travel of the panels around the curved track sections 31. It will be seen that no part of this hinge arrangement projects inwardly from the inner surface of the door where it might cause injury to cargo.

As the door is moved down from its open position toward its closed position the proper interfitting or matching of the notches and tongues of each lap joint 51—54 is facilitated by an aligning or guiding function performed by a guide plate 81 carried by the outer surface of each panel, which guide plate interacts with the outer mounting bracket 71 that supports the guide track roller and cable roller of the next adjacent section.

Referring now to this mounting bracket, and the interaction of the guide plate therewith, the bracket 71 is of channel form, comprising an attaching base 72 and two outwardly projecting side flanges 73. The upper countersunk bolt 42 which passes through the upper portion of the inner closure plate 41 also passes through the base or web portion 72 of the mounting bracket 71 for rigidly securing the mounting bracket to the outer side of the panel at the upper outer corner of the panel. Extending transversely through the spaced side flanges 73 is a roller supporting shaft 74 upon which a guide roller 75 is mounted. Relative rotation can occur between the roller 75 and the shaft 74, and between the shaft 74 and the side flanges 73, and the shaft 74 is also free to slide axially in the side flanges 73. The roller has free rolling engagement within its respective guide track sections 27, 31, 32 and the shaft 74 may be formed with outwardly crimped portions 76 so as to prevent the shaft from shifting inwardly to the point where the roller 75 might rub against the mounting bracket or possibly become separated from the track. Spaced outwardly and upwardly of the guide roller shaft 74 is another shaft 78 which extends transversely through the side flanges 73 and supports the cable roller 79 therebetween. This cable roller holds the counterbalancing cable away from the upper outer edge of the panel as the door moves upwardly into its overhead open position, as I shall later describe. Cooperating with each mounting bracket 71 is the aforementioned aligning or guide plate 81 which extends down along the outer surface of each panel at the side edge thereof. As shown in Figure 5, the upper end of each guide plate 81 is lapped up over the base portion 72 of the mounting bracket 71 and is anchored between the side flanges of the mounting bracket by the upper countersunk bolt 42. The lower countersunk bolt 42 of each panel also passes through the lower portion of the guide plate for fixedly anchoring the lower end of the plate. Beyond this lower bolt 42, the plate is bent outwardly as indicated at 82 and then inwardly as indicated at 83. The outer surface of the inwardly bent portion 83 is adapted to function as a sloping cam surface or wedging surface for pressure engagement against the under or back side of the guide roller shaft 74, and the lower inner edge of this inwardly bent portion 83 is adapted to engage the outer surface 72' of the mounting bracket base portion 72 at a point below the guide roller shaft 74. When the door moves upwardly to open position and the panels articulate around the curved sections of the guide tracks the cam surface 83 moves upwardly or away from the guide roller shaft 74, but when the door moves downwardly toward closed position this cam surface 83 moves back into engagement with the shaft 74 and thereby exerts a panel aligning force on the lower edge of the upper panel for insuring that the notch and tongue portions of the lap joint 51—54 will be guided into proper alignment, and for insuring that the ends of the panels, particularly at their lower edges, will be pressed outwardly against the door jambs, to prevent the leakage of fine bulk material, such as grain, etc. It will be observed that there is no guide roller for guiding the lower edge of each panel, such being unnecessary or undesirable in view of the short radius of curvature of the curved track sections 31. However, the guiding function performed by the guide plates 81 coacting with the roller shafts 74 insures proper guidance of the lower edge of each panel notwithstanding the absence of a roller guiding function for this lower edge. As shown in Figure 2, the lower side edges of each guide plate 81 are cut off at a slight taper 81' to insure free sliding movement of this lower end between the side flanges 73 of the mounting bracket 71. It will be seen from the foregoing that the outwardly and inwardly bent tongue portion 82, 83 is adapted to function as a tapering guide prong which extends below the lower edge of its associated panel. It will also be seen that the inner surface of the guide roller shaft 74 and the outer surface 72' of the mounting bracket base portion 72 cooperate with each other to define a tapering socket which is adapted to receive the tapering prong 82, 83. Each tapering prong 82, 83 moves outwardly in its respective tapering socket 74, 72' as the associated panels travel around the curved track sections 31, and this tapering prong moves back into a snug fit in its respective tapering socket 74, 72' for vertically aligning the panels as the panels travel downwardly into door closing position.

Referring now to the spring counterbalancing best shown in Figures 1 and 2, each utility door has its own counterbalancing mechanism comprising an overhead spring supporting shaft 85 having its ends fixedly or nonrotatably mounted in the tranverse channel beams 33 or in brackets carried thereby. The shaft 85 associated with the left hand door 35 is disposed substantially at the end of the lower horizontal track section 32, and the shaft 85 associated with the right hand door 35' is disposed substantially at the end of the upper horizontal track section 32'. Rotatably mounted on the opposite ends of each shaft 85 are the cable winding reels or drums 86 upon which wind the steel counterbalancing cables 87 which have their lower ends fastened to the lower panel 39 of the door. Each cable winding reel 86 is free to rotate upon the shaft 85 and is also free to slide axially along the length of the shaft. The counterbalancing force is established by an individual torsion spring 88 for each reel 86, the two springs having their outer ends attached to their respective winding reels 86, and having their inner ends attached to an adjusting hub 89 which is rotatably mounted on an intermediate part of the shaft 85. This adjusting hub has polygonal surfaces for the application of an adjusting wrench thereto, and extending diametrically through these polygonal surfaces are holes 91 adapted to register with a diametrical hole extending through the shaft 85, whereby after the hub 89 has been rotated to the desired position for properly adjusting the counterbalancing springs 88 a locking pin or key can be passed through the aligned holes in the adjusting hub and in the mounting shaft 85 for holding the hub in this desired position of adjustment. The two springs 88, 88 to each side of the adjusting hub 89 are right hand and left hand springs respectively, so that one direction of rotation will simultaneously increase the tension in both springs, and the other direction of rotation will simultaneously decrease the tension in both springs. It will be evident that as the door is raised and lowered the rotation of the winding reels 86 first in one direction and then in the other direction will vary the effective lengths of their respective torsion springs 88. As these springs are lengthened or shortened they transmit shifting movement to their respective winding reels 86 axially along the shaft 85, whereby the reels shift concurrently with the winding and unwinding operations. In this manner, a level winding operation is obtained, so that there is no tendency for later turns of the cable to pile up on earlier turns of the cable.

As shown in Figure 1, the steel cables 87 pass from their winding reels 86 over appropriately placed guide sheaves 94, 94' and thence down to their respective doors. In extending down from these guide sheaves to their respective doors, the cables pass obliquely outwardly through the doorways 17, 17' at such angle that they intersect the upward path of the door panels when the latter move up to closed position. This means that the cables would tend to cut into the upper edges of the panels, were it not for the cable rollers 79 carried by the mounting brackets 71. As each door panel moves through the curved path defined by the curved track sections 31 its cable roller 79 holds the cable spaced from the top edge of the panel.

The lower ends of the two cables have attachment to guide pins 96 carried by the bottom door panel 39. The outer side plates 81a secured to the outer side edges of this bottom panel are formed with mounting eyes 97 at their lower ends, in which mounting eyes the guide pins 96 are mounted. The lower end of the corresponding cable has looped attachment over the associated guide pin 96, from which it will be seen that the tension transmitted through the cable exerts an outwardly acting component of force against the bottom panel 39, tending to hold this bottom panel pressed outwardly toward the vertical track sections 27. The ends of the pins 96 are projected outwardly beyond the side edges of the bottom panel for travel in the guideway of the guide tracks 27, 31 and 32. Thus, the lower edge of this bottom panel 39 has guided support by the tension of the cables tending to hold the ends of the guide pins 96 pressed outwardly against the outer surfaces of the track guideways.

In Figure 9 I have illustrated fragmentarily the improved hold-open latch which I may employ for positively holding each door in its overhead open position, so that it cannot be jostled or shaken down into its closed position by the vibration or jolting of the car in travel. This latch comprises a beam or bar 98 for each one of the utility doors, such beam or bar extending transversely of the car directly beneath the roof and disposed substantially medially of the width of the doorway. The outer end of the bar is pivoted upon a bolt 99 carried by a bracket 101 secured to the upper frame structure of the car. The latch bar is free to have a rising and falling movement, and its falling movement is limited by the outer tail end of the bar striking the under side of the frame member 102, as indicated at 103. The inner swinging end of the bar has a latching nose 105 which is adapted to drop down over an angle bar 106 which is bolted at 107 to the bottom panel 39 of the door. As the door moves upwardly toward its open position the latch bar 98 rides on the outer surfaces of the door panels until the angle bar 106 passes the latching nose 105, whereupon this end of the bar drops in behind the angle for positively locking the door in its overhead position in the horizontal track sections 32 or 32'. To release the door, it is only necessary to push upwardly on the latch bar 98 and then start the door downwardly.

As shown in Figure 2, the angle bar 106 also serves the additional purpose of a pry-bar angle when the door is in its closed position. That is to say, this angle bar 106 affords a reinforced surface under which a pry-bar can be inserted for starting the door in an upward direction from its closed position. Bow handles 109 are also secured to the bottom door panel 39 to facilitate opening and closing movements of the door. It may be desired to positively lock the utility door in its closed position to prevent any possibility of accidental opening under the action of the counterbalancing cables and the jolting of the car, and to this end I have provided locking bolts 111, 111 mounted upon the outer side of the top door panel 36. These locking bolts are mounted for rotative and sliding movement in mounting brackets 112, and are provided with handle portions 114 which enable the bolts to be projected outwardly into locking holes in the vertical track sections 27, when the door is in its closed position. When the handle portions 114 are swung downwardly they are locked against shifting movement by the retainer clips 115.

While I have illustrated and described what I regard to be the preferred embodiment of my invention, nevertheless it will be understood that such is exemplary and that numerous modifications and rearrangements may be made therein without departing from the essence of the invention.

I claim:

1. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, and loose articulating connections between adjacent panels comprising astragal plates carried by the inner surfaces of adjacent panels having flanges projecting in an outward direction at the ends of said astragal plates substantially at the meeting edges of said panels, guide slots in said flanges, articulating links passing vertically through said guide slots, lost motion slots in the ends of said articulating links, and studs carried by said plates loosely engaging in said lost motion slots, whereby said loose articulating connections permit the adjacent edges of said panels to have relative movement in an inward and outward direction with respect to said doorway and to have relative movement upwardly and downwardly with respect to said doorway in the travel of said panels around said curved track sections.

2. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by the upper portions only of said panels for traveling in said guide tracks, the lower portions of said panels swinging free of guide roller restraint when passing around said curved track sections, loose articulating connection between adjacent panels comprising astragal plates carried by the inner surfaces of adjacent panels at the side edges thereof, each of said astragal plates having flanges projecting in an outward direction at the ends of said plates substantially at the meeting edges of said panels, guide slots in said flanges, articulating links passing vertically through said guide slots, lost motion slots in the ends of said articulating links, and studs carried by said plates loosely engaging in said lost motion slots, whereby said loose articulating connections permit the adjacent edges of said panels to have relative movement in an inward and outward direction with respect to said doorway and to have relative movement upwardly and downwardly with respect to said doorway in the travel of said panels around said curved track sections, and guide means effective at the outer surfaces of said panels comprising guide plates mounted on the outer sides of said panels having sloping cam surfaces, and deflecting surfaces on the next adjacent panel against which the cam surfaces of said guide plates react in the relative movement between adjacent panels.

3. In an overhead sliding door for the side doorway of a railway freight car, the combination of guide tracks comprising vertical track sections at the sides of said doorway, curved track sections curving inwardly from the upper portions of said vertical track sections, and substantially horizontal track sections extending inwardly from said curved track sections below the roof of the car, a sliding overhead type of door for movement in said guide tracks comprising a plurality of panels, rollers carried by the upper portions only of said panels travelling in said guide tracks, the lower portions of said panels swinging free of guide roller restraint when passing around said curved track sections, lap joints between the edges of adjacent panels each comprising a tongue formed at the outer surface of each lower panel extending upwardly into a notch in the outer surface of the next higher panel, whereby any fine cargo in the freight car is required to flow upwardly in the lap joint in order to leak out through the joint, and loose articulating connections between adjacent panels permitting the adjacent lap joint edges of said panels to have relative movement in an inward and outward direction with respect to said doorway and to have relative movement upwardly and downwardly with respect to said doorway, whereby to permit substantial separating motion between the tongue and notch of each lap joint as the joint moves around the curved sections of the track.

4. In an overhead sliding door of the class described, the combination of guide tracks comprising substantially vertical sections mounted adjacent the side edges of the doorway, substantially horizontal sections extending inwardly above the top of said doorway, and curved track sections curving inwardly from the upper ends of said vertical track sections to said horizontal track sections, a door comprising a plurality of articulated panels carrying guide rollers travelling in said guide tracks, said door having lost motion hinge connections between said panels, said connections comprising a pin carried on each end of the upper of adjoining panels adjacent the lower edge thereof, similarly disposed pins carried on the lower of adjoining panels adjacent the upper edge thereof, and slotted links connecting the pins at each end of the panels, said links being substantially shorter in length than the width of the panels, a counterbalancing mechanism comprising a winding reel and a cable extending downwardly therefrom along the outer side of said door when the latter is in its closed position, cable guide rollers carried by the upper edges of said panels and spaced outwardly therefrom for holding said cable spaced outwardly from the front surfaces of said panels, means connecting said cable with the lowermost panel, and guide means associated with the lower edge of said lower panel and travelling in said guide tracks.

5. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, and loose articulating connections between adjacent panels comprising matching recesses formed in the inner surfaces of adjacent panels substantially at the ends of the meeting edges of said panels, astragal plates mounted on the inner surfaces of adjoining panels and overlying said recesses, said astragal plates having outwardly bent end flanges extending into said recesses, said end flanges having slots formed therein, studs anchored in said astragal plates and projecting from said plates into said recesses each in a direction substantially at right angles to the plane of its respective panel, and hinge links extending between said matching recesses through the slots in said end flanges, and slots in the ends of said hinge links engaging over said studs.

6. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, and loose articulating connections between adjacent panels comprising matching recesses formed in the inner surfaces of adjacent panels at the meeting edges thereof, astragal plates mounted on the inner surfaces of said panels and overlying said recesses, studs carried by said astragal plates and projecting into said recesses each in a direction substantially at right angles to the plane of its respective panel, and hinge links extending between said matching recesses and having slots in their ends engaging over said studs.

7. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, and loose articulating connections between adjacent panels comprising matching recesses formed in the inner surfaces of adjacent panels at the meeting edges thereof, astragal plates mounted on the inner surfaces of said panels and overlying said recesses, studs carried by said astragal plates and projecting into said recesses each in a direction substantially at right angles to the plane of its respective panel, and hinge links extending between said matching recesses and having slots in their ends engaging over said studs, the slotted ends of said hinge links being bent to slope slightly in an inward direction so as to prevent binding between said hinge links and said studs during hinging movement between panels in passing around said curved track sections.

8. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, loose articulating connections between adjacent panels, guide rollers carried by the upper portions only of said panels for traveling in said guide tracks, the lower portions of said panels swinging free of guide roller restraint through said loose articulating connections when passing around the curved sections of said guide track, and panel aligning apparatus for bringing the meeting edges of adjacent panels into alignment when the door is moved into closed position, said panel aligning apparatus comprising tapering prong means carried on the outer surfaces of a plurality of said panels, and tapering socket means also carried on the outer surfaces of a plurality of said panels and adapted to receive said tapering prong means.

9. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, loose articulating connections between adjacent panels comprising studs mounted on the end portions of said panels and extending substantially at right angles to the planes of their respective panels, links extending between adjacent panels and having slotted ends engaging over said studs, and panel aligning apparatus for bringing the meeting edges of adjacent panels into alignment when the door is moved into closed position, said panel aligning apparatus comprising tapering prong means carried on the outer surfaces of a plurality of said panels, and tapering socket means also carried on the outer surfaces of a plurality of said panels and adapted to receive the tapering prong means of adjacent panels.

10. In an overhead sliding door for closing a doorway, the combination of guide tracks comprising substantially vertical track sections at the sides of the doorway, curved track sections curging inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, lap joints between adjacent panels comprising tongues extending from certain edges of said panels engaging in grooves formed in the opposite edges of adjoining panels, loose articulating connections between adjacent panels comprising studs mounted on said panels and extending substantially at right angles to the planes of their respective panels, links extending between adjacent panels and having slotted ends engaging over said studs, and panel aligning apparatus for bringing the meeting edges of adjacent panels into alignment when the door is moved into closed position, said panel aligning apparatus comprising tapering prong means carried on the outer surfaces of a plurality of said panels, and tapering socket means also carried on the outer surfaces of a plurality of said panels and adapted to receive the tapering prong means mounted on adjacent panels.

11. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, loose articulating connections between the inner sides of said panels, U-shaped brackets mounted on the outer sides of a plurality of said panels substantially at the upper edges thereof, each of said U-shaped brackets comprising a base portion secured to the panel and formed with two outwardly projecting side flanges, two shafts extending transversely through the side flanges of each bracket, a guide track roller mounted on one of said shafts and traveling in said guide tracks, a cable guide roller mounted on the other of said shafts, there being a socket space defined between the base portion of each U-shaped bracket and one of said shafts, guide tongues mounted on the outer sides of a plurality of said panels and projecting downwardly from the lower edges of their respective panels, each of said guide tongues being adapted to enter the socket space in the U-shaped bracket mounted on the next lower panel, and counterbalancing mechanism mounted adjacent to the upper portions of said guide tracks and comprising cables passing down over the outer sides of said panels and bearing against said cable guide rollers carried by said U-shaped brackets, the ends of said cables being secured to the lower portion of the door.

12. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, loose articulating connections between the inner sides of said panels, U-shaped brackets mounted on the outer sides of a plurality of said panels, each of said U-shaped brackets comprising a base portion secured to the panel and two outwardly projecting side flanges, a shaft extending transversely through the side flanges of each bracket, a guide track roller mounted on said shaft and traveling in said guide tracks, there being a socket space defined between the base portion of each U-shaped bracket and said shaft, and guide tongues mounted on the outer sides of a plurality of said panels, each of said guide panels being adapted to enter the socket space defined in the U-shaped bracket carried by the adjacent panel.

13. In an overhead sliding door for closing a doorway, the combination of guide tracks comprising substantially vertical track sections at the sides of the doorway, curved track sections curving inwardly from the upper portions of said vertical track sections, and substantially horizontal overhead track sections extending inwardly from the inner ends of said curved track sections, a sliding overhead type of door for movement in said guide tracks comprising a plurality of panels, guide rollers carried by said panels traveling in said guide tracks, loose articulating connections between adjacent panels, lap joints between adjacent panels comprising tongues extending from certain edges of said panels engaging in grooves formed in the opposite edges of adjoining panels, and panel aligning apparatus comprising upper guide surfaces carried by a plurality of said panels and spaced outwardly from the outer surfaces thereof, and lower guide surfaces carried by a plurality of said panels and spaced outwardly from the outer surfaces thereof, said upper and lower guide surfaces of adjoining panels having cooperative engagement for aligning the adjoining panels when said panels move downwardly in said vertical track sections.

References Cited in the file of this patent

UNITED STATES PATENTS

| | | |
|---|---|---|
| 661,713 | Cockings | Nov. 13, 1900 |
| 820,020 | Shaffer | May 8, 1906 |
| 1,071,220 | Elefant | Aug. 26, 1913 |
| 1,427,915 | Sellgren | Sept. 5, 1922 |
| 1,435,784 | Arnold | Nov. 14, 1922 |
| 1,630,680 | Twedt | May 31, 1927 |
| 1,721,501 | McKee | July 23, 1929 |
| 1,852,913 | Bauer | Apr. 5, 1932 |
| 1,868,233 | Hungerford | July 19, 1932 |
| 1,995,431 | McCloud | Mar. 26, 1935 |
| 2,119,011 | Holt et al. | May 31, 1938 |
| 2,189,020 | Rowe | Feb. 6, 1940 |
| 2,194,111 | Blodgett | Mar. 19, 1940 |
| 2,214,653 | Barlough | Sept. 10, 1940 |
| 2,227,571 | Clark | Jan. 7, 1941 |
| 2,311,703 | Sihvonen | Feb. 23, 1943 |
| 2,525,309 | Norberg | Oct. 10, 1950 |
| 2,584,134 | Knutson | Feb. 5, 1952 |